United States Patent [19]

Pignato

[11] 4,129,039

[45] Dec. 12, 1978

[54] DUAL GAUGE INDICATING DEVICE

[76] Inventor: Gaetano Pignato, 214 Douglas Ave., West Islip, N.Y. 11795

[21] Appl. No.: 848,102

[22] Filed: Nov. 3, 1977

[51] Int. Cl.² ............... G01F 23/08; G01F 23/12
[52] U.S. Cl. .................................. 73/310; 73/320; 73/432 A
[58] Field of Search ............ 73/310, 312, 320, 432 A, 73/DIG. 5; 116/129 R

[56] References Cited

U.S. PATENT DOCUMENTS

| 953,261 | 3/1910 | Donisthorpe | 73/310 |
|---|---|---|---|
| 1,108,489 | 8/1914 | Campbell | 73/320 |
| 1,300,327 | 4/1919 | Benjamin | 73/310 |
| 1,453,716 | 5/1923 | Maggill | 73/310 |
| 1,570,481 | 1/1926 | Grain | 73/310 |
| 1,679,285 | 7/1928 | Wright | 73/312 |
| 2,716,341 | 8/1955 | Ilfrey | 73/312 |
| 2,722,835 | 11/1955 | Ragland | 73/312 |

Primary Examiner—S. Clement Swisher
Assistant Examiner—Denis E. Corr
Attorney, Agent, or Firm—Leonard H. King

[57] ABSTRACT

A dual gauge device for simultaneously indicating the quantity of liquid in a container and the amount of liquid that has been added to the container during a selected period of time irrespective of the amount of liquid withdrawn from the container during the same period of time.

14 Claims, 8 Drawing Figures

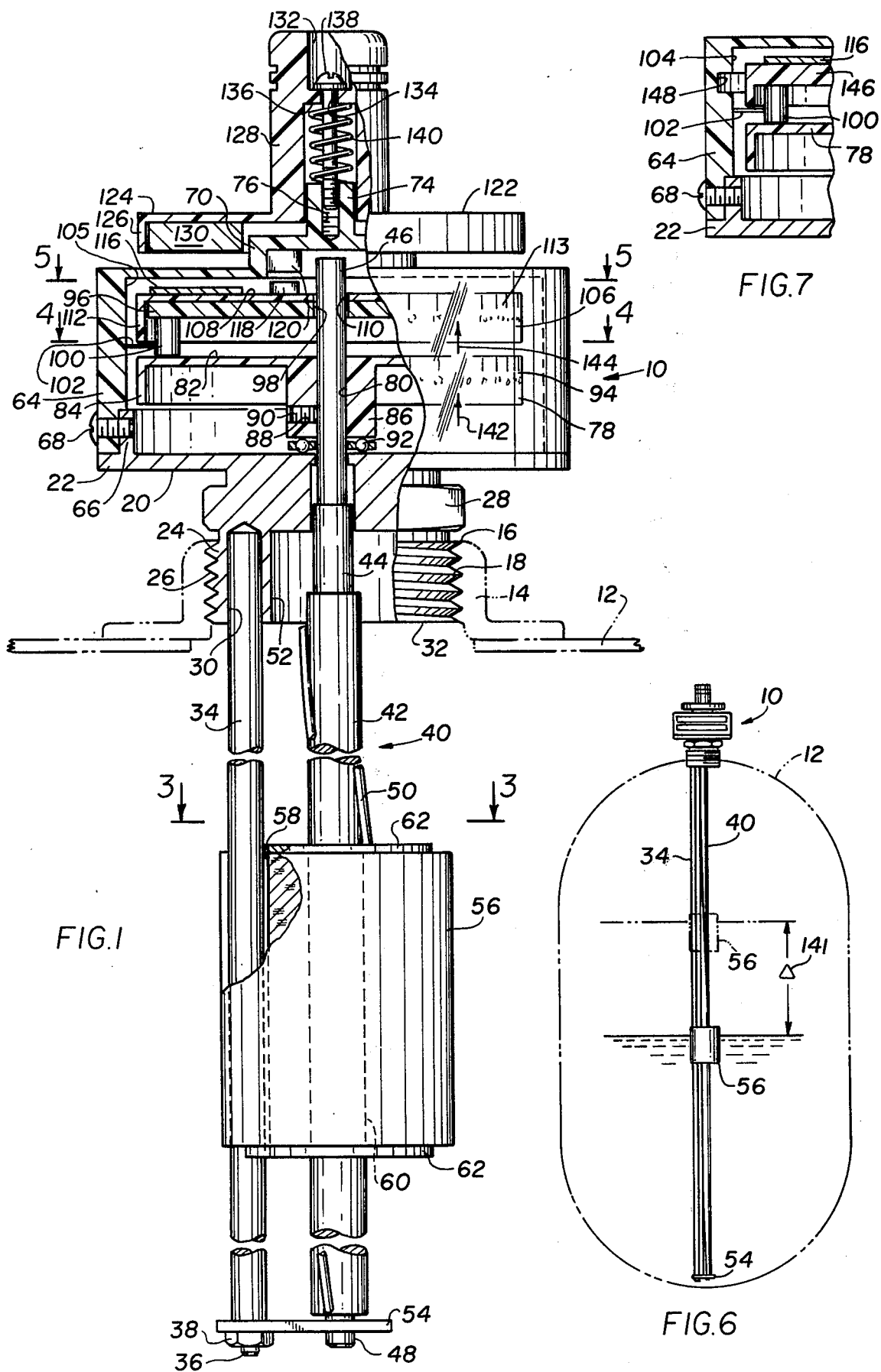

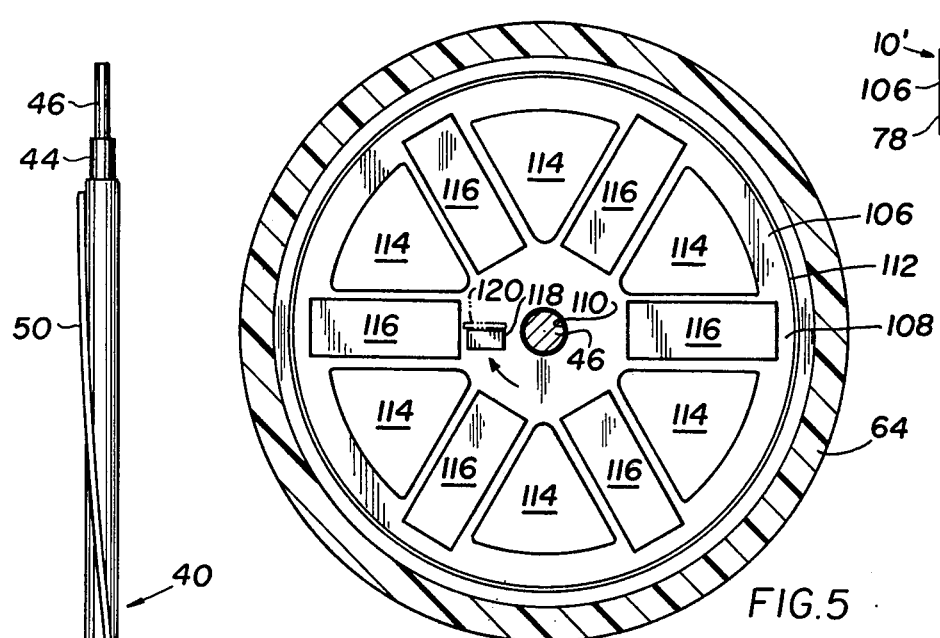
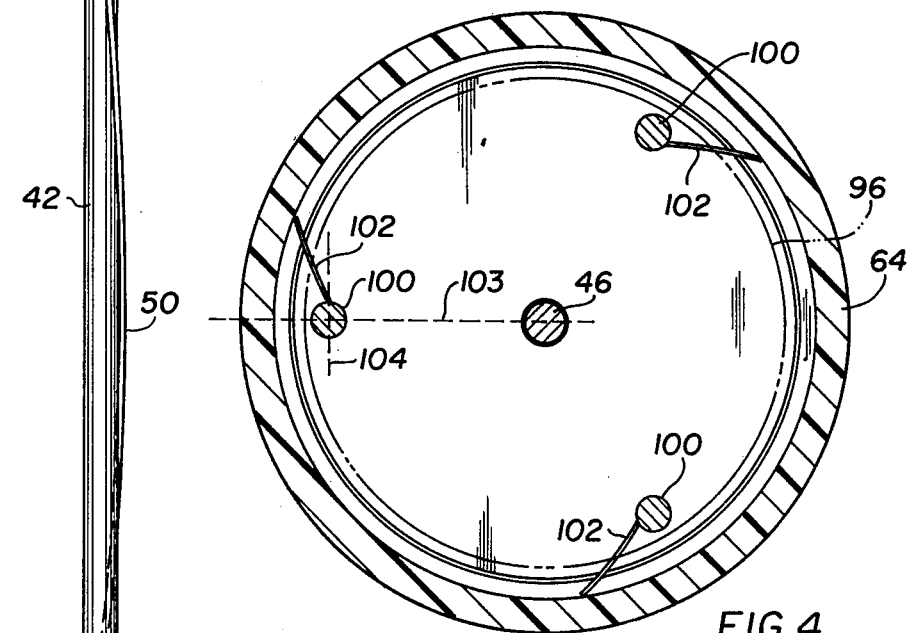
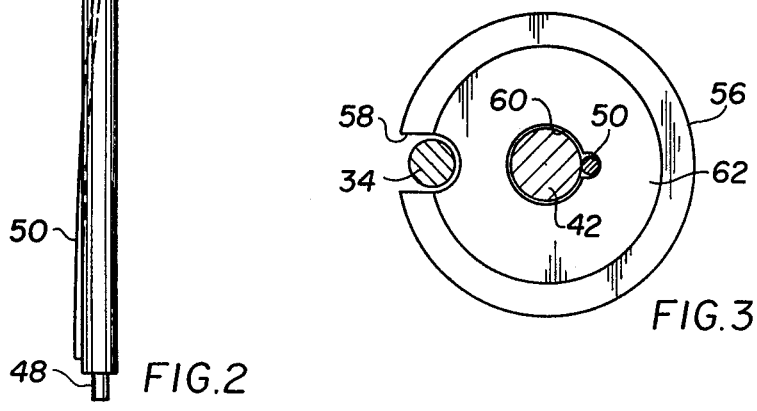
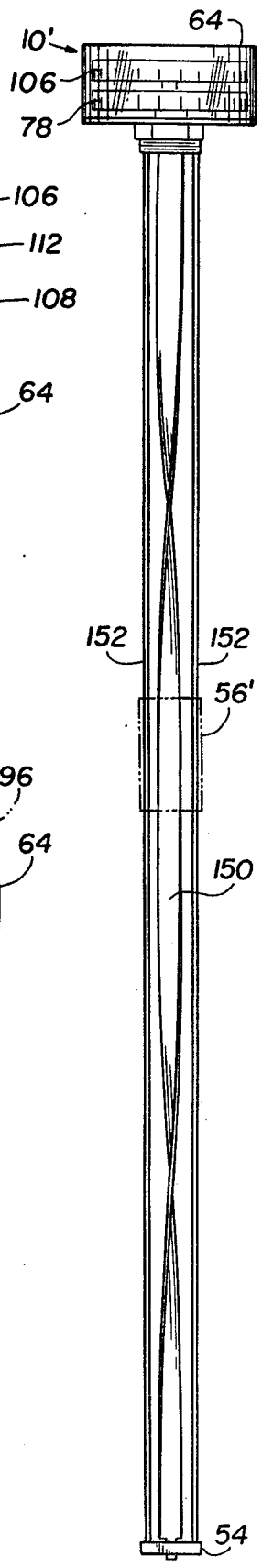
FIG.5
FIG.4
FIG.2
FIG.3
FIG.8

DUAL GAUGE INDICATING DEVICE

BACKGROUND OF THE INVENTION

The field of this invention is liquid-level indicating devices.

In situations in which a liquid is to be stored in a container or tank and withdrawn for use as required, it is desirable that the amount of liquid remaining in the tank at any time be easily ascertainable. Typically, a float-actuated mechanism is inserted into the tank to drive an external indicating means. The float rises and falls with the liquid level in the tank and is calibrated in conjunction with the indicating means to register the amount of liquid in the particular container. Representative devices of this type are described in U.S. Pat. No. 2,716,341 to W. T. Ilfrey et al. and U.S. Pat. No. 2,722,835 to D. Ragland.

A gauge of this general type is often used in private homes and like premises to indicate the amount of fuel oil remaining in an oil storage tank. Such tanks are usually located in the basement of the building where the heating or hot water system, which is powered by the oil, is generally found and where the occupant can conveniently periodically check the amount of oil remaining therein. Oil is typically added to the tank from an inlet point located outside of the premises and connected to the tank by a conduit.

With the recent rapid rise in the price of such fuel oil, homeowners have become increasingly sensitive to the cost of maintaining a sufficient supply of oil in their tanks. Furthermore, the high price of the fuel has encouraged some disreputable dealers to overcharge consumers when filling their storage tanks, claiming to have added more oil thereto than they actually have. To avoid such abuses, many homeowners have begun to carefully watch the gauges on their tank. By reading the gauge just before and immediately after a delivery, the precise amount of oil added to the tank can be determined and then compared with the dealer's charges. However, often the homeowner may not know when oil is to be delivered. He may not be at home when the dealer arrives, or he may be on an extended vacation at the time and in such cases it is virtually impossible to be sure that an accurate, independent determination of the amount of oil delivered can be made.

The prior art teaches a number of similar devices for indicating the amount of liquid, such as oil, that has been added to a container. U.S. Pat. No. 1,453,716 to C. F. MacGill describes a fluid registering mechanism for such purpose specifically adapted for use with an automobile gasoline tank. Use of the MacGill device would appear to be limited to tanks of limited capacity due to the gearing arrangement by which the cumulating counter is driven. Furthermore, there is no suggestion in the disclosure as to how the interlock mechanism on the device for disabling the counter at all times other than when the tank is being filled might be adapted for use with a liquid storage container to which liquid is added from a remote location.

U.S. Pat. No. 1,679,285 to H. F. Wright teaches a gauge and recorder for indicating both the amount of liquid added to a container and the amount withdrawn therefrom. This device records such information on a paper chart and requires the user to replace the chart on a daily basis, necessitating constant supervision. The Wright apparatus is therefore highly inconvenient for home use where a daily determination of the liquid level in the storage tank and the amount of liquid added thereto is neither necessary nor desired.

There is, therefore, a need for a direct reading indicating device that combines a gauge showing the quantity of liquid remaining in the tank with a second gauge which records the amount of liquid that has been added to the tank irrespective of liquid since withdrawn therefrom, which is practical and convenient for unattended use by an average homeowner and is adapted for mounting atop a home storage tank.

OBJECTS OF THE INVENTION

It is, therefore, an object of the present invention to provide a dual gauge device that indicates the quantity of liquid stored in a container and simultaneously indicates the amount of liquid that has been added to the container irrespective of the amount of liquid that has since been withdrawn therefrom.

It is a further object to provide such a dual gauge device that may be easily reset to an initial zero position to enable the unattended operation thereof over an extended period of time.

It is still another object of the present invention to provide such a dual gauge device having a closed housing to inhibit the escape of vapors and fumes from the storage container.

It is an additional object of the present invention to provide such a dual gauge device that is simple to construct and uses a minimum number of easily fabricated components to assure trouble-free operation over an extended period of time.

Another object and feature of the present invention resides in the novel details of construction which provides a dual gauge indicating device that is easy to install and that is economical to use and service.

Other objects and features of the present invention will become apparent from the following detailed description considered in connection with the accompanying drawing. It is to be understood, however, that the drawing are designed for the purposes of illustration only and not as a definition of the limits of the invention for which reference should be made to the appending claims.

DESCRIPTION OF THE DRAWING

In the drawing, wherein similar reference characters denote similar elements throughout the several views:

FIG. 1 is a partial cross-sectional view of a dual gauge indicating device according to the present invention illustrating its attachment to a wall portion of a liquid storage container;

FIG. 2 is an enlarged detail of the rotary shaft which forms a part of the indicating device shown in FIG. 1;

FIG. 3 is a cross-section of the float taken along lines 3—3 of FIG. 1;

FIG. 4 is a cross-section showing the platform legs resting atop the dial member taken along lines 4—4 of FIG. 1;

FIG. 5 is a cross-section of the registering member taken along lines 5—5 of FIG. 1;

FIG. 6 is a sectional view of a liquid storage container showing the operative mounted position of the dual gauge indicating device of FIG. 1 atop the container;

FIG. 7 is a sectional view of a portion of an alternative arrangement of the housing of the dual gauge indicating device of FIG. 1; and FIG. 8 is an elevational view of a modification of the dual gauge indicating device of FIG. 1.

DETAILED DESCRIPTION OF THE PREFERRED EMBODIMENT

Turning now to the drawing, and in particular to FIG. 1 thereof, there is shown a preferred embodiment of a dual gauge liquid level indicating device, generally designated by the reference numeral 10, constructed in accordance with the present invention. Although the device 10 is specifically described and illustrated for use in simultaneously indicating the quantity of fuel oil remaining in a storage tank and the amount of oil added thereto over a selected period of time, it should be appreciated that the described application is by way of example only and is not intended to limit the use of the present invention solely to such application.

As shown in FIG. 1, the dual gauge device 10 is adapted for use with a liquid-storage container or tank or reservoir 12. Such tanks 12 are often located in residential buildings for the storage of home fuel oil and the like used to power heating and hot water systems. The tank 12 is generally provided, in addition to inlet and outlet openings (not shown) for the oil or other liquid stored therein, with a circular tank flange 14 projecting outwardly of the surface of the tank 12 and bounding an opening 16 therein to accommodate means for indicating the amount of oil remaining in the tank. For this purpose, the flange 14 carries interior threads 18 about the peripheral defines of the opening 16.

The indicating device 10 includes a base member 20 which comprises a generally planar support plate 22 of substantial circular cross-sectional configuration and a mounting flange 24 projecting therefrom. The mounting flange 24 is provided at its tube-like distal end with threads 26 about the outer circular periphery thereof which conform to the interior threads 18 of the tank flange 14 for cooperative releasable engagement therewith. Thus, the threaded mounting flange 24 is screwed into the threaded tank flange 14 to provide a substantially fluid-tight fit therebetween. The base member 20 may include wrench flats 28 intermediate the support plate 22 and the end threads 26 to facilitate the completion of a tight fit between the mounting flange 24 of the device 10 and the tank flange 14. The base member 20 may be constructed of a galvanized iron or the like to prevent the accumulation of rust thereon as a result of vapors or fumes eminating from the liquid storage tank 12.

A bore 30 is defined in the bottom surface 32 of the mounting flange 24. The bore 30 is offset relative to the central axis of the circular mounting flange 24 and opens into the interior of the tank 12. An elongated guide rod 34 is journaled within the bore 30, the sizing of the peripheral configuration of the rod 34 and of the defines of the bore 30 being such that when the former is driven into the latter, the rod is frictionally held in the bore 30. The guide rod 34 projects downwardly from the flange 24 into the interior of the tank 12 and substantially to the bottom thereof. Although the rod 34 is shown to be of circular cross-section, it should be understood that such configuration is not essential and forms no part of the present invention. At its lower free end, the guide rod 34 terminates in a reduced diameter portion 36 which may be threaded for receipt of a threaded nut 38 for reasons that will become clear as this description proceeds.

A shaft, generally designated by the reference numeral 40, is seen in greater detail in FIG. 2 to include a central portion 42, an intermediate reduced diameter portion 44, and further reduced diameter portions 46 at its proximal end and 48 at its distal end. The shaft 40 is of substantially circular cross-sectional configuration therealong and includes a rib 50 spiraling around the outer peripheral surface of the central portion 42. The rib 50 encircles the central portion 42 not more than once and, as will be further described hereinafter, may be of non-uniform contour as it proceeds about the periphery of the shaft 40.

As shown in FIG. 1, the shaft 40 is positioned to extend through a central axial passage 52 in the base member 20. The shaft 40 is rotatable relative to the member 20 and the passage 52 is, therefore, configured to loosely conform to the stepped cross-sectional arrangement of the shaft 40 and, in particular, to the portions 42, 44 and 46 passing therethrough. The shaft 40 is positioned substantially parallel and in spaced relation to the guide rod 34 and the lengths of the shaft 40 and of the rod 34 are so selected to position their respective reduced end portions 48, 36 at substantially the same depth adjacent the bottom of the tank 12. In order to maintain said parallel spaced relation between the shaft 40 and the guide rod 34, a foot member or plate 54 is provided with apertures defined therein to receive the respective end portions 48, 36 thereof. The sizing of the shaft end portion 48 and of the aperture into which it is journaled is such as to enable the free rotation of the shaft 40 relative to the member 54. The member 54 may be positioned between the nut 38 and the guide rod's threaded end portion 36 which receives the nut so as to positionally secure the member 54 as shown.

A float 56 is slidably associated with the guide rod 34 and rotary shaft 40 for axial movement therealong. As depicted in FIG. 3, the float 56 is of generally circular cross-section, although the same may be configured in any convenient form. A longitudinal channel 58 is defined in the outer wall of the float 56 to receive the guide rod 34 in guiding relation therethrough. A central axial bore 60 in the float 56 receives the central portion 42 of the rotary shaft 40 therethrough and is configured to closely conform to the cross-sectional configuration thereof and in particular to that of the spiral rib 50 positioned on its outer periphery. It is contemplated that the float 56 be fabricated of cork or like material that is buoyant in and resists chemical attack from the particular liquid to be stored in the tank 12.

A pair of guide plates 62 are positioned at opposite ends of the float 56. The configuration of the plates 62 is such as to substantially conform to the cross-sectional arrangement of the float 56, including the placement and shape of the channel 58 and of the bore 60. The plates 62 provide non-deformable guides for the rib-bearing shaft 40 and add extra weight to the float 56 to insure that the same is adequately responsive to small changes in the liquid level in the tank 12. It is, therefore, preferred that the guide plates 62 be fabricated of a rigid metallic material sufficient to impart a satisfactory relationship between the weight and buoyancy of the float 56 and the friction resulting from movement of the float along the rod 34 and the shaft 40.

A circular housing 64 is positioned atop the support plate 22 of the base member 12. To secure the two to one another, the support plate 22 may be provided with several upstanding tabs 66, each having a threaded aperture into which a screw 68 is inserted after passing through the housing 64. In order to maintain a substantial closure of the tank opening 16 and thereby prevent the escape of vapors and fumes from the tank 12 into the surrounding environment, the housing 64 when positioned atop the support plate 22 provides a fully enclosed area within which the indicating components of the present invention are located. Although not absolutely necessary, a silicone sealant or the like may be used to complete a fluid-tight seal between the housing 64 and the support plate 22 to thereby insure the presence of an absolute closure that will prevent the escape of fumes from the tank opening 16 into the surrounding air.

The housing 64 is provided on its top surface and inwardly spaced from the outer periphery thereof with a shoulder 70 defining an upward stepped continuation or extension 72. A boss 74 projects upwardly from the extension 72 and includes therein a central bore 76 for receiving a threaded screw. The housing as illustrated is transparent and may be conveniently fabricated of Plexiglas. Although it is not required that the entire housing be transparent, at least a portion thereof must be clear so as to enable an observer to see the relative rotative positions of the indicating members therein positioned, as will be fully described hereinafter.

The proximal end 46 of the rotary shaft 40 terminates within the housing 64 and more particularly substantially adjacent the extension 72 thereof. A circular rotary dial member 78 includes a central axial throughbore 80 for fixedly receiving the shaft proximal end portion 46 therethrough so as to effect rotation of the dial 78 with like movement of the shaft 40. The dial member 78 comprises a planar top surface 82, a downwardly extending lip 84 depending from the peripheral edge of the top surface 82 and a central post or extension 86 through which the bore 80 is defined.

The post 86 includes a threaded aperture 88 for receiving a set screw 90 in order to secure the dial member 78 to the shaft 40 for rotation therewith. To further facilitate the unimpeded rotation of the dial member 78, a thrust-bearing assembly 92 may be positioned between the bottom surface of the post 86 and the base support plate 22 to significantly reduce frictional forces therebetween. Indicia 94 on the dial lip 84 are visible through the transparent housing 56 to indicate the quantity of liquid remaining in the tank 12 in a manner to be described.

A circular platform carries plural legs 100 extending therefrom and is provided with a central axial passage 98. Each leg 100 has projecting outwardly of the leg a spring wire or wedging member 102 which may be fabricated of spring steel or a similar material which has the properties of rigidity and elasticity. Each wire 102 is selectively affixed in a like manner to its respective leg 100 so as to position the wire 102 such that it extends from the platform 96 substantially parallel thereto and, as seen in FIG. 4, such that the angle at which the wire 102 projects from the platform 96 lies intermediate a radius 103 drawn through the respective leg 100 and a line 104 drawn through the leg that is askew to the adjacent peripheral edge of the platform 96. An angle of approximately 75° from such a radius 103 has been found to be satisfactory. The passage 98 loosely receives therethrough the shaft proximal end portion 46 to position the platform legs 100 in supported relation on the dial top surface 82 so as to rest the platform 96 atop the dial member 78. The spring wires 102 cooperate with the inner surface 105 of the housing sidewall as shown in FIG. 4.

The platform 96 is preferably constructed of a metallic material to provide the platform with sufficient mass to enable it to freely rotate with the dial member 78 in a counter-clockwise direction; if the mass of the platform 96 is too small, the frictional drag placed on its movement by reason of the contact of the spring wires 102 with the housing interior surface 105 will inhibit its free counter-clockwise rotation.

As a result of the selective directional positioning of the ends of the spring wires 102 relative to the housing surface 105, however, the platform 96 is prevented from rotational movement in the clockwise direction as the shaft 40 so rotates. Thus, the spring wires 102 effect a wedging action in cooperation with the housing surface 105, and the platform 96 is rendered non-rotatable in the clockwise direction. Since the platform 96 merely rests atop the dial member 78 and is not secured thereto, the legs 100 are able to slide or slip on the dial top surface 82 as the same rotates in a clockwise direction.

A circular registering member of dial 106 comprises a planar top surface 108 including a central axial bore 110 therethrough and a downwardly depending lip 112 extending from the peripheral edge of the surface 108. The lip 112 carries indicia 113 on its outwardly-oriented surface. For reasons that will become clearer as this description proceeds, the member 106 should be relatively light-weight and may, therefore, include cutouts 114 in its top surface 108 to reduce the mass thereof. The member 106 is preferably constructed of a light-weight non-magnetic material, such as plastic or the like.

The registering member 106 carries on its top surface 108 a plurality of rectangular metallic bodies 116. The bodies 116 may assume any convenient shape and position on the surface 108 and it should be noted that the number of such bodies included thereon is purely a matter of engineering design choice and should not be construed as a limiting factor in this description of the invention. The particular material of construction of the metallic bodies 116 is similarly unimportant so long as the bodies 116 are attracted by a magnetic field flux. In addition to the metallic bodies 116, the surface 108 carries an upward projection 118 which is selectively positioned thereon proximate the central bore 110 for cooperating with a stop or protrusion 120 downwardly depending from the interior surface of the housing stepped continuation 72. The relative extension of the projection 118 and of the stop 120 is such that no contact is effected therebetween while the registering member 106 is in its normal operating position relative to the housing 64 as shown in FIG. 1.

A reset member 122 comprises a substantially planar, circular surface 124 having a downwardly depending lip 126 extending from the peripheral edge thereof and an upwardly projecting grasping or handle portion 128 on the central portion of the surface 124. The reset member 122 is constructed of a non-metallic or a non-magnetic material, such as wood or plastic, and carries plural magnets 130 selectively positioned on the underside of its surface 124 adjacent the lip 126. The placement of the magnetic 130 on the reset member 122 is such as to conform to the location of the metallic bodies 116 on the registering member 106 so that when the latter is concentrically aligned with the former in a manner to be described, the magnets 130 are advantageously positioned to exert a magnetic attraction on the bodies 116.

The handle portion 128 is shown in FIG. 1 to be of substantially circular cross-section and sufficiently elongated to facilitate grasping of the same by the hand of a user of the present invention. A widened axial bore 132 is defined through the center of the handle portion 128 and includes a narrowed portion or constriction 134 partially defined by the shoulder 136. The widened portion of the bore 132 is sized to loosely receive therein the housing boss 74. With the boss so positioned in the bore 132, a threaded screw 138 journals the narrowed constriction 134 and engages the bore 76 in the boss 74 to attach the reset member 122 to the housing 64. A spring 140 is compressibly positioned about the screw 138 and is constrained at its ends by the shoulder 136 on the handle 128 and by the upper surface of the housing boss 74 to normally maintain the surface 124 of the reset member 122 in spaced relation from the housing 64. The spacing therebetween is selectively adjustable by the depth to which the screw 138 engages the defines of the bore 76 and should be chosen so as to prevent the magnets 130 from exerting an attracting force on the metallic bodies 116 that is sufficiently strong to effect movement of the bodies 116 and thereby of the entire registering member 106 upon which they are positioned upwardly toward the magnets 130.

In operation, the indicating device 10 is mounted atop the container or tank 12 in accordance with the description above. As shown in FIG. 6, the float 56 and the rods 34,40 along which it is movable are inserted into the interior of the tank 12 and the housing 64 is positioned on the outer surface of the tank. As the liquid level in the container 12 rises and falls due to additions and withdrawals of liquid therefrom, as indicated by the reference symbol 141, the float 56 remains on the surface of the liquid and therefore rises and falls therewith. The guide rod 34 engages the through channel 58 and thereby prevents the rotation of the float 56 as the same slides along the length of the rod 34.

The simultaneous axial movement of the float along the length of the central portion 42 of the rotary shaft 40 acts to effect the rotation of the shaft 40 since the rib 50 spiraling about the same is forced to maintain a constant position relative to the non-rotatable float 56. Thus, in the embodiment shown and described, an increase in liquid level will cause a counter-clockwise rotation of the shaft 40 while a decrease in level will rotate the shaft in the clockwise direction.

It should be noted that the tank 12, as depicted in FIG. 6, is of non-uniform cross-sectional shape over its height. For an increase or decrease in liquid level of a fixed amount of liquid, the shaft 40 will rotate a greater distance if the level change occurs at the top or bottom of the tank than if it occurs proximate the central portion thereof, leading to erroneous readings. This non-uniformity may be compensated by varying the uniformity of the spiral of the spiral rib 50 about the shaft 40 at the upper and lower ends of the central portion 42. The compensation would have to be made on an individual basis for a particular shape of container 12.

The dial member 78 is directly affixed to the shaft 40 for rotation therewith. The dial 78 rotates with the shaft 40 in both clockwise and counter-clockwise directions to respond to decreases and increases, respectively, in the container liquid level. It should be clear, then, that indicia 94 properly positioned on the dial 78 will at all times indicate, relative to a fixed mark or hairline 142 on the transparent housing 64, the amount of oil or other liquid remaining in the tank 12 available for use. The dial 78 may be calibrated, in conjunction with the indicia 94, so as to indicate the amount remaining in the tank 12 either directly in gallons or as fractions of the total capacity of the tank.

As the dial 78 turns in the counter-clockwise direction it carries with it the platform 96 which rests in supported relation thereon. Movement of the platform 96 with the shaft 40 in the clockwise direction, however, is prevented by the wedging action of the wires 102 against the housing inner surface 105. As the shaft 40 and the dial 78 rotate clockwise, the platform maintains its then current rotational orientation. Thus, the platform is rotatably responsive only to increases in the liquid level in the tank 12.

The registering member 106 is supportably positioned atop the platform 96 but is not fixed thereto. As a result of this arrangement, the member 106 rotates with the platform 96, and, since the platform 96 is not clockwise rotatable, the registering member 106 is not driven clockwise and is therefore turned only in the counter-clockwise direction. The indicia 113 on the member 106 cooperate with a mark or hairline 144 on the transparent housing 64 which may be located adjacent the similar mark 142 to register the toal magnitude of increases in the liquid level in the tank 12. Each increase in level is clearly the result of an addition of liquid to the tank 12 as, for example, by the partial or complete filling of the tank with oil by the fuel company that supplies the premises. Thus, a resident of the premises can easily determine whether he has actually received the amount of oil for which he has been charged by checking the position of the registering dial 106 at any convenient time after the oil delivery, since the same will maintain its position—and hence its reading—irrespective of a decrease in the liquid level resulting from subsequent usage of the oil.

The dual indicating device 10 is further provided with means for setting the dial 106 to an initial or zero position. To do so, the user grasps the handle portion 128 of the reset member 122 and moves the member 122 downwardly against the force of the spring 140 so as to position the reset member surface 108 adjacent the upper surface of the housing 64. This movement also results in the adjacent positioning of the magnets 130 on the reset member 122 and the metallic bodies 116 on the dial 106 on opposite sides of the housing top surface. As the magnets 130 approach the metallic bodies 116, the magnetic force of the former on the latter is sufficiently increased to enable said magnetic force to physcially move the bodies 116 toward the magnets 130 and thereby lift the dial 106 off the platform 96.

Continuing to downwardly press the reset member 122 against the force of the spring 140 to thereby maintain the magnetic link or bond between the magnets 130 and the metallic bodies 116, the handle 128 may now be turned in a clockwise direction to correspondingly rotate the dial 106 via said magnetic link. This clockwise rotation of the dial 106 thus enables the same to be initially positioned at a zero reading so that the dial 106 will thereafter record increases in the liquid level that occur subsequent to the resetting operation without regard to level increases that occurred prior thereto. The dial projection 118 and the housing stop 120 cooperate when the dial 106 is lifted to disengage the same from the platfom 96 so as to prevent the clockwise rotation of the dial 106 past the initial or zero point as indicated by the position of the indicia 113 relative to the hairline 144. The reset member 122 is lastly released whereby the force of the spring 140 returns the member 122 to its normal position, breaking the magnetic link between the magnets 130 and the metallic bodies 116 to reposition the dial 106 atop the platform 96.

Thus, after the user sets the registering dial 106 to its initial or zero position in the manner set forth above, all deliveries of oil to the tank 12 will be measured and recorded on the dial 106. The user is therefore able to easily and conveniently compare the magnitude of such deliveries with the amount for which he is being charged, regardless of whether or not he is at the premises at the time of the delivery or, in fact, even if he is on an extended vacation at the time. The registering dial 106 will accumulate all subsequent deliveries until again reset, while the dial member 78 simultaneously provides an indication of the amount of liquid remaining in the tank 12 at the moment the reading is taken.

Although the present invention has been described relative to a preferred embodiment thereof, it is within the contemplation of the invention, as found in practice, that a number of modifications and substitutions of components thereof are permissible without changing the nature and scope of the teachings herein. For example, as shown in FIG. 7, the platform 96 and the registering member 106 may be integrally fabricated as a single unit 146. To enable the disengagement of the spring wires 102 from contact with the interior of housing surface 105 so as to permit the clockwise rotation of the integral registering platform 146, a channel or trough or groove 148 may be recessed about the interior housing surface 105. Thus, when the reset member 122 is depressed to magnetically engage the integral registering platform 146, the platform 146 is upwardly moved away from the dial member 78 to position the ends of the wires 102 within the defines of the channel 148 and thereby out of wedging engagement with the housing surface 105. The registering platform 146 is then freely rotatable in the clockwise direction and such rotation may be effected by means of the reset member 122 so as to set the same to its initial or zero position.

Release of the reset member 122 results in the decoupling or disengagement of the metallic bodies 116 and the magnets 130, permitting the platform 146 to drop back to its normal position atop the dial top surface 82 by means of the action of gravity on its mass. This movement of the platform 146 carries with it the wires or wedging members 102 attached thereto to move the same out of the defines of the channel 148 and return them to their normal position for wedging contact with the housing interior surface 105. The integral registering platform 146 must, of course, be constructed so as to be sufficiently light-weight to be lifted by the magnets 130 from its normal supported engagement on the dial 78 while still having sufficient mass to enable its gravity-induced return to said normal position and its rotation with the dial 78 as the same turns in the counterclockwise direction.

It should be further appreciated that the shaft 40 may alternatively be configured as shown in FIG. 8. As depicted, an elongated, flat, blade-like member or strip 150 is transversely twisted along its length through no more than a single complete revolution. A central axial bore or slit through the float 56' is configured to conform to and accept the strip member 150 therethrough so as to cause the same to rotate as the float 56' non-rotatably moves along the length thereof. A pair of guide rods 152 are positioned on opposite sides of the float 56' and in engagement therewith to prevent the rotation of the float. The operation of the alternative dual indicating device 10' is in all other respects the same as that described above.

Many additional modifications and substitutions are also possible. The shape and configuration of various of the components of the dual indicating device may be changed to suit individual design tastes. The particular directions of permitted rotations described may be reversed, depending upon the position and placement of several of the parts of the device, as for example the direction of the spiral of the rib 50 about the rotary shaft 40, and the extended positions of the wires 102 from the platform legs 100. These and other changes are within the scope and contemplation of the present invention but do not change the basic nature thereof.

While there have been shown and described and pointed out the fundamental novel features of the invention as applied to a preferred embodiment thereof, it will be understood that various additional omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In a device for indicating the level of liquid in a container,
   a first dial rotatable in a first direction to indicate an increase in liquid level and in a second direction to indicate a decrease therein so as to provide a continuous indication of the liquid level in the container by means of the relative rotative position of said first dial,
   a second dial releasably engaged with said first dial for rotation therewith in said first direction and non-rotatable therewith in said second direction, said second dial registering by its relative rotative position the magnitude of an increase in the container liquid level irrespective of a subsequent decrease in such level,
   and means cooperating with one of said dials for disengaging said first and second dials and for rotating said second dial in said second direction to reset the same to an initial registering position whereby only those increases in liquid level occurring subsequent to resetting of the second dial to said initial position will be registered thereby, said disengaging and rotating means including magnetic means for releasable coupling with said second dial to release the same from engagement with said first dial so as to enable the resetting of said second dial to its initial position by rotation of the same in said second direction.

2. In the liquid level indicating device of claim 1, further including a non-magnetic housing within which are positioned said first and second dials,
   and wherein said disengaging and rotating means is positioned on the outside of said housing and cooperates with said second dial through said housing by means of said magnetic coupling means to release said second dial from engagement with said first dial and to rotate said second dial in said second direction.

3. In the liquid level indicating device of claim 2, wherein the container is provided with an opening and said housing is positioned atop the opening, said housing being a relatively complete closure about the opening to provide a substantially fluid-tight seal thereabout so as to prevent the escape of liquid vapor therefrom, whereby the position of said disengaging and rotating means on the outside of said housing and the provision of said magnetic coupling means thereof enables maintenance of said substantially fluid-tight seal during the resetting of said second dial to its initial position.

4. In the liquid level indicating device of claim 1, said disengaging and rotating means further including biasing means for normally maintaining a decoupled relationship between said magnetic means and said second dial so as to normally enable rotation of the second dial in said first direction and prevent its rotation in said second direction.

5. In the liquid level indicating device of claim 1, further including wedging means associated with said second dial to normally prevent the rotation of the same in said second direction, and a housing within which are positioned said first and second dials, said housing having an interior surface with which said wedging means normally cooperates to prevent the rotation of said second dial in said second direction.

6. In the liquid level indicating device of claim 5, said housing having a groove selectively located on the interior surface thereof for cooperating with said wedging means, the said selective location of said groove being such that when said first and second dials are respectively disengaged by actuating said disengaging and rotating means to move said second dial away from said first dial said wedging means is positioned within the defines of said groove to enable the rotation of said second dial in said second direction so as to reset the same to its initial position, whereby terminating the actuation of said disengaging and rotating means returns said first and second dials to their normally-engaged position to carry said wedging means out of the defines of said groove.

7. In a device having a member rotatably responsive to the level of liquid in a reservoir, means for registering an amount of liquid added to the reservoir during a selected period of time comprising:
  platform means arranged for rotation with the member as the same rotates in a direction in response to an increase in the liquid level in the reservoir and arranged to prevent rotation of said platform means as the member rotates in an opposite direction in response to a decrease in the reservoir liquid level,
  scale means positioned on said platform means for rotation with the same so as to register by its relative rotational position the magnitude of an increase in the amount of liquid in the reservoir,
  and reset means cooperating with said scale means for disengaging the same from said platform means to enable the rotation of said scale means in said opposite direction so as to set said scale means to an initial position at the commencement of the selected period of time, whereby a subsequent increase in the reservoir liquid level will result in the rotation of said scale means from said initial position and said scale means will retain its rotated position as the liquid level in the reservoir decreases so as to register the amount of liquid added to the reservoir since the commencement of the selected period of time irrespective of the quantity of liquid withdrawn therefrom.

8. In a device according to claim 7, said platform means including wedging means cooperable with said device for preventing rotation of the platform means in said opposite direction.

9. In a device according to claim 8 and further including a dial fixed to the rotating member for rotation therewith to indicate the quantity of liquid in the reservoir, said platform means being positioned in supported relation on said dial for rotation with the same as said dial rotates in said first direction and prevented by said wedging means from rotating with said dial as the same rotates in the opposite direction.

10. In a device according to claim 7, further including releasable magnetic coupling means on said scale means and reset means for releasable engagement therebetween, whereby coupling of said magnetic means results in disengagement of said scale means from said platform means by relative movement therebetween to space the former from the latter so as to enable the rotation of said scale means in said opposite direction in which said platform means is prevented from turning.

11. A device for indicating the quantity of liquid in a container and for registering the amount of liquid added to the container during a selected period of time, said device comprising:
  a housing,
  a rod-like member rotatively-responsive to the level of liquid in the container and extending from said housing into the container,
  a float in the container and slidably associated with said rod-like member to rotate the same in a first direction as the liquid level in the container increases and in a second direction as the liquid level decreases,
  a first dial in said housing and fixed to said rod-like member for rotation therewith to indicate by its relative rotative position the quantity of liquid in the container,
  a platform in supported relation on said first dial for rotation therewith in said first direction,
  wedging means on said platform to prevent the rotation of said platform in said second direction,
  a second dial releasably supported on said platform for rotation therewith in said first direction to indicate by its relative rotative position the amount of liquid added to the container,
  means for releasing said second dial from supported relation with said platform and for rotating said second dial in said second direction to reset the same at the beginning of the selected period of time during which the amount of liquid added to the container is to be determined to an initial rotational position, said releasing and rotating means being positioned on the outside of said housing,
  and releasably engageable magnetic coupling means on said second dial and on said releasing and rotating means for releasable engagement therebetween.

12. The indicating device according to claim 11, said wedging means cooperating with the housing to prevent rotation of said platform in said second direction.

13. The indicating device according to claim 11, said housing having at least a portion thereof transparent to the passage of light, and said first and second dials having indicia thereon cooperating with said housing and visible through said transparent portion thereof to indicate respectively the quantity of liquid in the container and the amount of liquid added thereto during the selected period of time.

14. The indicating device of claim 11, said releasing and rotating means comprising:

a magnetic coupling portion carrying said magnetic coupling means, a handle portion for facilitating the rotation of said second dial in said second direction during the releasable engagement between said second dial and said releasing and rotating means, and biasing means for normally maintaining a disengaged relation between said releasing and rotating means and said second dial.

* * * * *